No. 743,815. PATENTED NOV. 10, 1903.
C. W. BOYKIN.
VEHICLE WHEEL.
APPLICATION FILED JULY 22, 1903.
NO MODEL.

Witnesses
C. W. Boykin, Inventor.
Attorneys

No. 743,815. Patented November 10, 1903.

UNITED STATES PATENT OFFICE.

CLAUD WINSTON BOYKIN, OF CORINTH, MISSISSIPPI, ASSIGNOR OF ONE-HALF TO ELEAZAR P. SIMMONS, OF CORINTH, MISSISSIPPI.

VEHICLE-WHEEL.

SPECIFICATION forming part of Letters Patent No. 743,815, dated November 10, 1903.

Application filed July 22, 1903. Serial No. 166,604. (No model.)

*To all whom it may concern:*

Be it known that I, CLAUD WINSTON BOYKIN, a citizen of the United States, residing at Corinth, in the county of Alcorn and State of Mississippi, have invented a new and useful Wheel Construction, of which the following is a specification.

My invention relates to wheels, and has for its objects to provide in the construction of the latter a simple and efficient means whereby the tire will at all times be maintained tight upon the wheel and looseness and rattling of the spokes be obviated.

To these ends the invention comprises the novel details of construction and combination of parts more fully hereinafter described.

Figure 1:
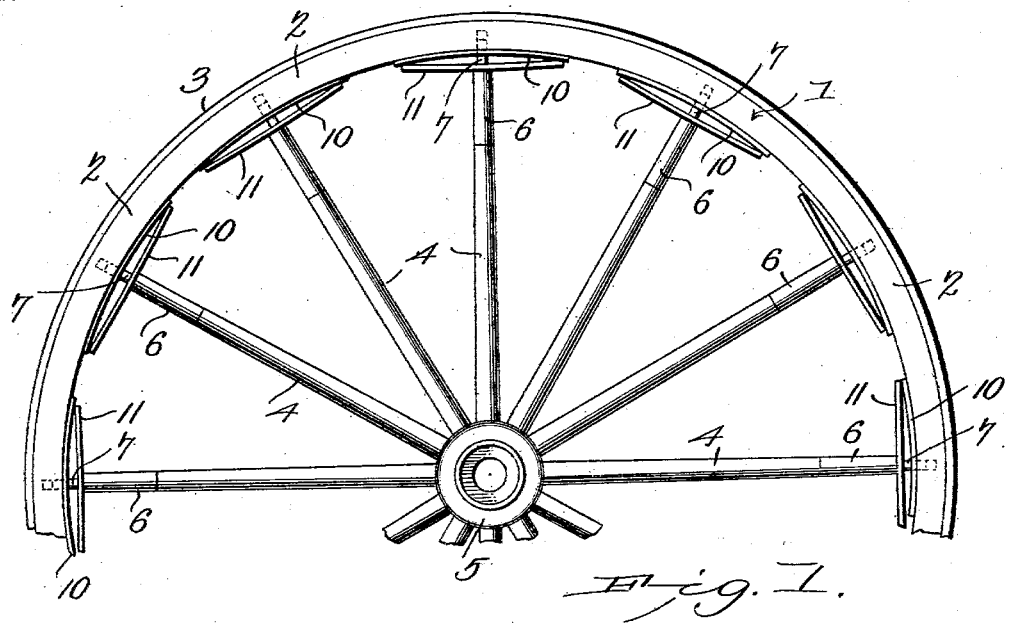
Figure 2:
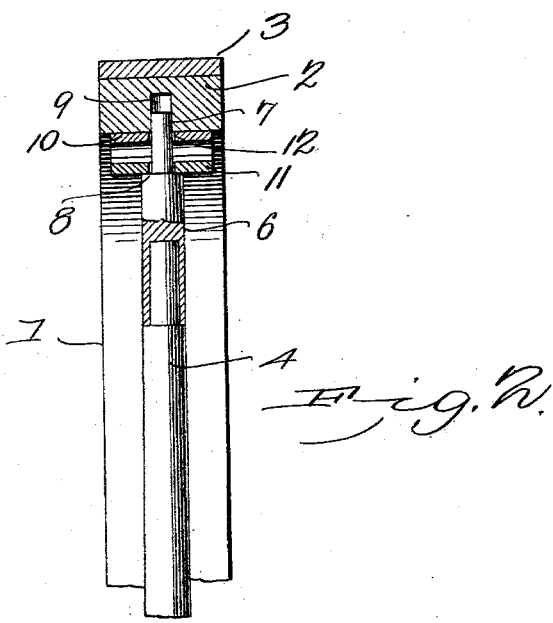

In the accompanying drawings, Figure 1 is a side elevation of a wheel embodying my invention. Fig. 2 is a detail sectional view through the felly on the line of one of the spokes.

Referring to the drawings, 1 indicates a wheel-rim composed of a series of fellys 2, said rim having applied to its outer face or periphery a metal band or tire 3, as usual.

4 indicates a series of spokes having their inner ends seated, as usual, in a hub 5, from which they radiate, said spokes each having applied to its outer end a metal thimble 6, forming a part or continuation of the spoke and provided in turn at its outer end with a reduced extension or tenon 7, which at its point of union with the spoke produces a shoulder or bearing 8.

Each felly is provided upon its inner face at its longitudinal center with an inwardly-extending socket or recess 9, which receives one of the spoke-tenons 7, upon which latter is arranged in elliptic array a pair of semi-elliptic springs 10 11, the former of which bears upon the inner face of the felly to which it conforms and the latter at its center upon the shoulder or bearing 8 of the spoke, said springs being centrally perforated, as at 12, to permit free passage of the tenon which movably engages the socket 9 for free sliding movement in a direction longitudinally of the spoke. Attention is here directed to the fact that the spring 10, which bears upon the felly, serves principally as a wearing-plate for the latter, and while preferably employed may, if so desired, be dispensed with without defeating the object in view, and consequently without departing from the spirit of the invention. It is also obvious that a single elliptic spring may be substituted for the pair of springs herein disclosed and the same end be attained.

In practice the tire will be applied to the wheel by shrinking or in other suitable manner, with the spring 11 under tension or that is partially compressed toward the felly, whereby any future expansion or contraction of the tire will be compensated for by the spring, the expansive force of which will serve to press the felly firmly against the tire and the spoke into secure engagement with the hub, whereby the tire will be maintained in a perfectly tight condition and looseness and rattling of the spokes be obviated.

In attaining the above-described objects it is to be understood that I do not limit or confine myself to the details of construction herein set forth, inasmuch as various changes other than those above explained may be made without departing from the scope of the invention.

Having thus described my invention, what I claim is—

1. The combination with a wheel-felly, of a spoke having a bearing, one of said parts being provided with a socket, a tenon associated with the other of said parts and movably engaging the socket, and a bowed spring disposed between the spoke-bearing and felly.

2. The combination with a wheel-felly having a socket, of a spoke having a bearing adjacent to its terminal and its end beyond the shoulder movably engaging the socket, and a a bowed spring disposed between the spoke-bearing and felly.

3. The combination with a wheel-felly having a socket, of a spoke, a tenon carried thereby and forming a shoulder at the point of juncture with the spoke, said tenon movably engaging the socket, and a pair of semi-elliptic springs disposed in elliptic array between the spoke-shoulder and felly.

In testimony that I claim the foregoing as my own I have hereto affixed my signature in the presence of two witnesses.

CLAUD WINSTON BOYKIN.

Witnesses:
H. A. HUFF,
J. A. GIOVEN.